(12) United States Patent
Dharmadhikari et al.

(10) Patent No.: US 9,627,789 B2
(45) Date of Patent: Apr. 18, 2017

(54) MODULE COMPATIBILITY INDICATION SYSTEM

(71) Applicant: Dell Products L.P., Round Rock, TX (US)

(72) Inventors: Vivek Dharmadhikari, San Jose, CA (US); James Laurance Mangin, San Ramon, CA (US); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 14/661,956

(22) Filed: Mar. 18, 2015

(65) Prior Publication Data

US 2016/0275773 A1    Sep. 22, 2016

(51) Int. Cl.
*H01R 13/00* (2006.01)
*G06F 1/16* (2006.01)
*H04M 1/02* (2006.01)
*G08B 23/00* (2006.01)

(52) U.S. Cl.
CPC .......... *H01R 13/00* (2013.01); *G06F 1/1632* (2013.01); *H04M 1/0274* (2013.01); *G08B 23/00* (2013.01)

(58) Field of Classification Search
CPC . G06F 11/2289; G06F 13/4072; G11C 29/08; H04L 69/14; H04L 69/18; G01R 31/2803; H05K 2201/044; H05K 2201/049; G05B 2219/21134; G05B 2219/25451
See application file for complete search history.

(56) References Cited

U.S. PATENT DOCUMENTS

| | | | | |
|---|---|---|---|---|
| 5,841,287 A * | 11/1998 | Duley | ................. | G06F 13/4072 324/537 |
| 6,216,186 B1 * | 4/2001 | Mayhead | .............. | G06F 11/006 710/301 |
| 2005/0114718 A1* | 5/2005 | Ito | ......................... | G06F 13/409 713/300 |
| 2008/0101049 A1* | 5/2008 | Casto | ....................... | G06F 1/18 361/788 |
| 2012/0040609 A1* | 2/2012 | Griffin | ................. | H04B 5/0043 455/41.1 |

(Continued)

OTHER PUBLICATIONS

"Cisco ASR 9000 Series Aggregation Services Router Hardware Installation Guide," pp. 1-14, http://www.cisco.com/c/en/us/td/docs/routers/asr9000/hardware/installation/guide/asr9kHIGbk/asr9klGinstallcards.html.

*Primary Examiner* — Mirza Alam
(74) *Attorney, Agent, or Firm* — Haynes and Boone, LLP

(57) ABSTRACT

A compatibility indication system includes a connectable module that includes a first connector and a first wireless communication device that is configured to transmit connectable module information. A computing system includes a second connector and a second wireless communication device that is configured to receive the connectable module information when the connectable module is located adjacent the second connector. A compatibility engine in the computing system is coupled to the second wireless communication device and configured to receive the connectable module information, determine a compatibility level of the connectable module, and activate a warning that is based on the compatibility level before the first connector on the connectable module is connected to the second connector on the computing system.

20 Claims, 10 Drawing Sheets

(56) References Cited

U.S. PATENT DOCUMENTS

2014/0334112 A1\* 11/2014 Tian .................... G06F 13/4022
 361/729
2015/0002296 A1\* 1/2015 Bell ...................... G06F 1/1632
 340/540

\* cited by examiner

MODULE COMPATIBILITY INDICATION SYSTEM

BACKGROUND

The present disclosure relates generally to information handling systems, and more particularly to indicating the compatibility of connectable modules for information handling systems.

As the value and use of information continues to increase, individuals and businesses seek additional ways to process and store information. One option available to users is information handling systems (IHSs). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Connectable modules such as, for example, power supply units, fan systems, disk drives, optical drives, storages devices, and a variety of other connectable modules known in the art, or often connected to IHSs so as to increase the functionality of the IHSs. By "connectable", it is meant that these modules may be easily coupled to and removed from the IHS using a variety of different quick-connect and quick-release features such as male connectors, female connectors, and/or a variety of other connectors known in the art. As such, the functionality of IHSs may be "tailored", defined, or otherwise enabled by the user connecting such modules to IHSs.

However, conventionally, such modules may disadvantageously cause the IHSs and the user to face a variety of malfunctions and/or issues. For example, when the user would like to provide a new module with an IHS, the user generally needs to physically connect the module and the IHS via at least a connector. This can cause problems such as connector damage if the module connector on the module is not compatible with the IHS connector on the IHS. Furthermore, even if the connectors are compatible such that the module may be connected to the IHS, the user may need to wait for an operating system on the IHS to determine whether the connected module is compatible with the IHS. This is caused, at least in part, by the lack of detailed technical information being readily available for the user to check before the connecting the module to the IHS. Further still, some hardware and or software incompatibilities may not be detectable by the operating system. For example, an IHS may include a plurality of module slots that each have connectors that are configured to couple to power supplies and fan systems, but the fan systems may be designated for only certain module slots. In such a situation, the fan systems may be connectable to module slots that are designated for power supplies, which will cause airflow and thermal issues in the IHS.

Accordingly, it would be desirable to provide a module compatibility indicator system.

SUMMARY

According to one embodiment, an information handling system (IHS) includes a system connector; a wireless communication device; a processing system that is coupled to the system connector and wireless communication device; and a memory system that is coupled to the processing system and that includes instructions that, when executed by the processing system, cause the processing system to provide a compatibility engine that is configured to: receive, using the wireless communication device, connectable module information from the connectable module when the connectable module is located adjacent the system connector; determine a compatibility level of the connectable module; and activate a warning that is based on the compatibility level before the connectable module is connected to the system connector.

BRIEF DESCRIPTION OF THE DRAWINGS

FIG. 5e is a schematic view illustrating an embodiment of the connectable module of FIG. 3 being connected to the computing system of FIG. 2a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, a router, a switch, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
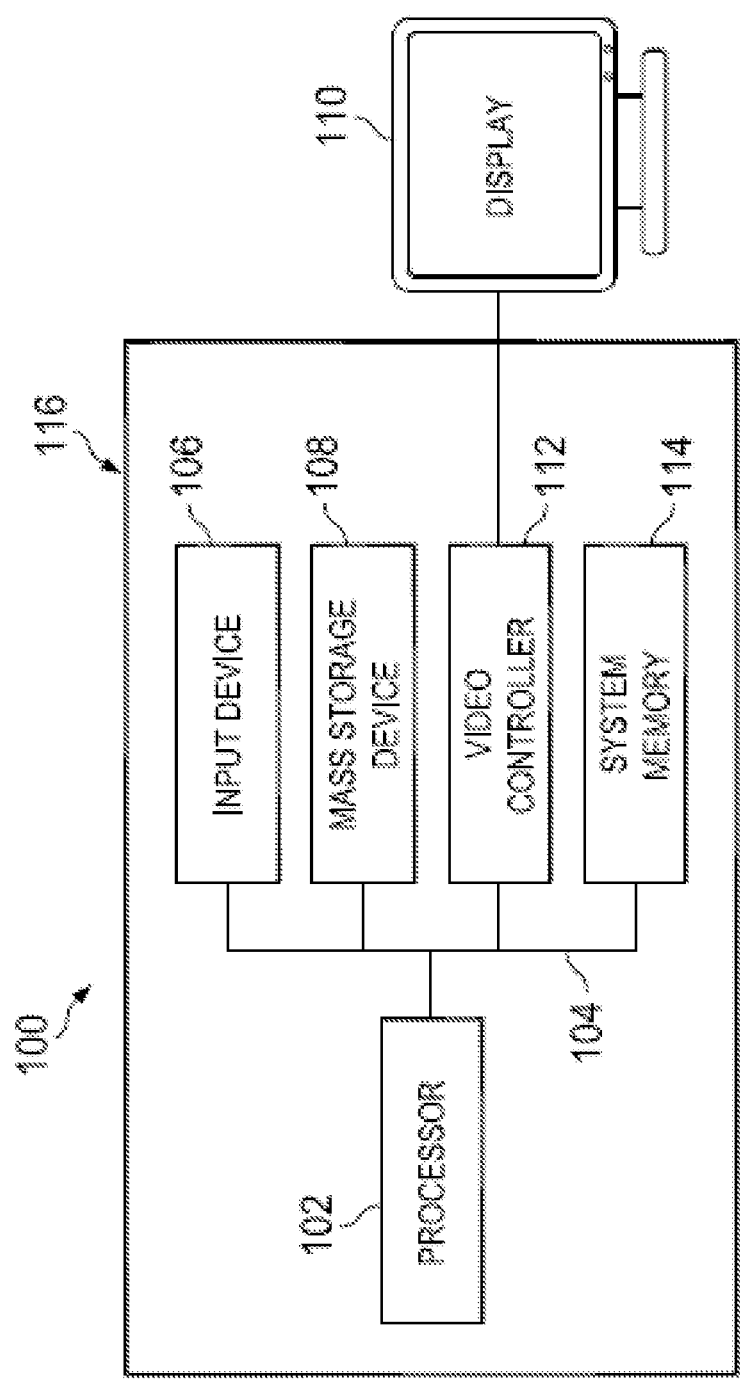
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
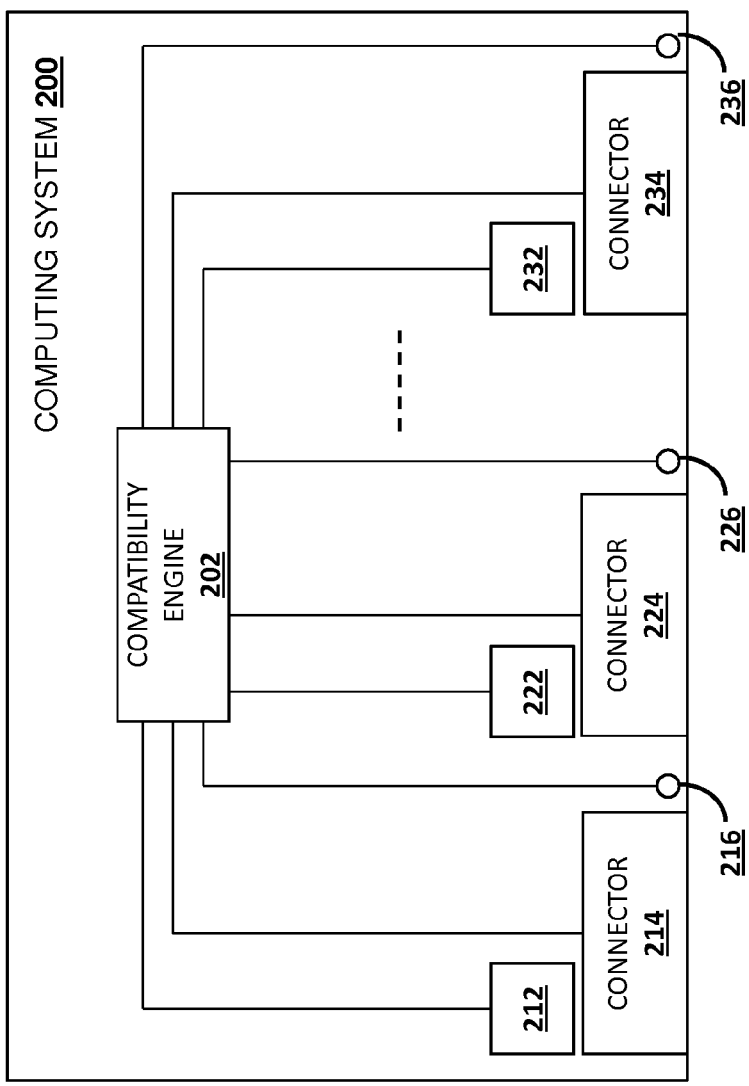
FIG. 2a is a schematic view illustrating an embodiment of a computing system.

Referring now to FIG. 2a, an embodiment of a computing system 200 is illustrated. In an embodiment, the computing system 200 may be the IHS 100 discussed above with reference to FIG. 1 and/or may include some or all of the components of the IHS 100. In the illustrated embodiment, the computing system 200 includes a compatibility engine 202 that is coupled to a plurality of wireless communication devices 212, 222, and 232, a plurality of connectors 214, 224, and 234, and a plurality of indicators 216, 226, and 236. As discussed below, each of the connectors 216, 226, and 236 is configured to connect a module. In the embodiments illustrated and discussed below, each of the connectors 214, 224, and 234 may be part of a modular connector subsystem that may include a device slot that is defined by the computing system and that is configured to house a modular device, as well as a male or female connector receptacle (e.g., on a mother board, riser board, and/or other circuit board known in the art.) In specific examples discussed below, the connectors 214, 224, and 234 are Field Replaceable Unit (FRU) connectors that are configured to connect power supply units (PSUs) and/or fan systems to the computing system 200. However, the connectors 214, 224, and 23 adjacent 4 may be any types of connectors known in the art, including, for example, Peripheral Component Interface (PCI) connectors, Universal Serial Bus (USB) connectors, High Definition Multimedia Interface (HDMI) connectors, DisplayPort connectors, Video Graphics Array (VGA) connectors, audio connectors, digital optic connectors, Digital Visual Interface (DVI) connectors, RCA connectors, Firewire connectors, eSATA connectors, phone connectors (e.g., RJ11), and/or a variety of other connectors known in the art. In the embodiments discussed and illustrated below, the indicators 216, 226, and 236 are light emitting devices (LEDs). However, the indicators 216, 226, and 236 may include sound emitting devices, moveable devices, display devices, and/or any other suitable devices that are capable of indicating a module compatibility to a user as discussed below.

More specifically in FIG. 2a, the compatibility engine 202 is coupled to the pluralities of wireless communication devices, connectors, and indicators. In an embodiment, each of the wireless connectors is associated with a respective wireless communication device and indicator. For example, the connector 214 is associated with the wireless communication device 212 and the indicator 216, the connector 224 is associated with the wireless communication device 222 and the indicator 226, and the connector 234 is associated with the wireless communication device 232 and the indicator 236. One of skill in the art in possession of the present disclosure will recognize that the associations discussed below between connectors, wireless communication devices, and indicators may be provided in a variety of manners to allow for the functionality of the wireless communication devices and indicators discussed below in indicating compatibility of a module being connected to their associated connector. As such, a wireless communication device may be configured to communicate only with a module being connected with its associated connector, and its associated indicator may be configured to indicate a warning for that module and connector. For example, the wireless communication device 212 may only communicate with modules adjacent the connector 214; and the indicator 216 may provide a warning that is responsive to an issue associated with that module and connector 214.

In one example, the association of a wireless communication device and a connector may involve the relative positioning of the wireless communication device and the connector (e.g., they may be positioned relatively close together) along with the "tuning" of the wireless communication capabilities (e.g., setting the wireless communication device to have a relatively short wireless communication range) such that it communications only with modules positioned relatively close to the connector. In addition, the compatibility engine 202 may associate wireless communication devices, connectors, and indicators in a database such that when a communication is received by a wireless communication device, the compatibility engine 202 associates that communication with a particular connector, and can activate an associated indicator as discussed below.

Still referring to FIG. 2a, the computing system 200 may include a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide the compatibility engine 202 that operates to perform the functions of the compatibility engines and/or computing system discussed below.

Figure 2B:
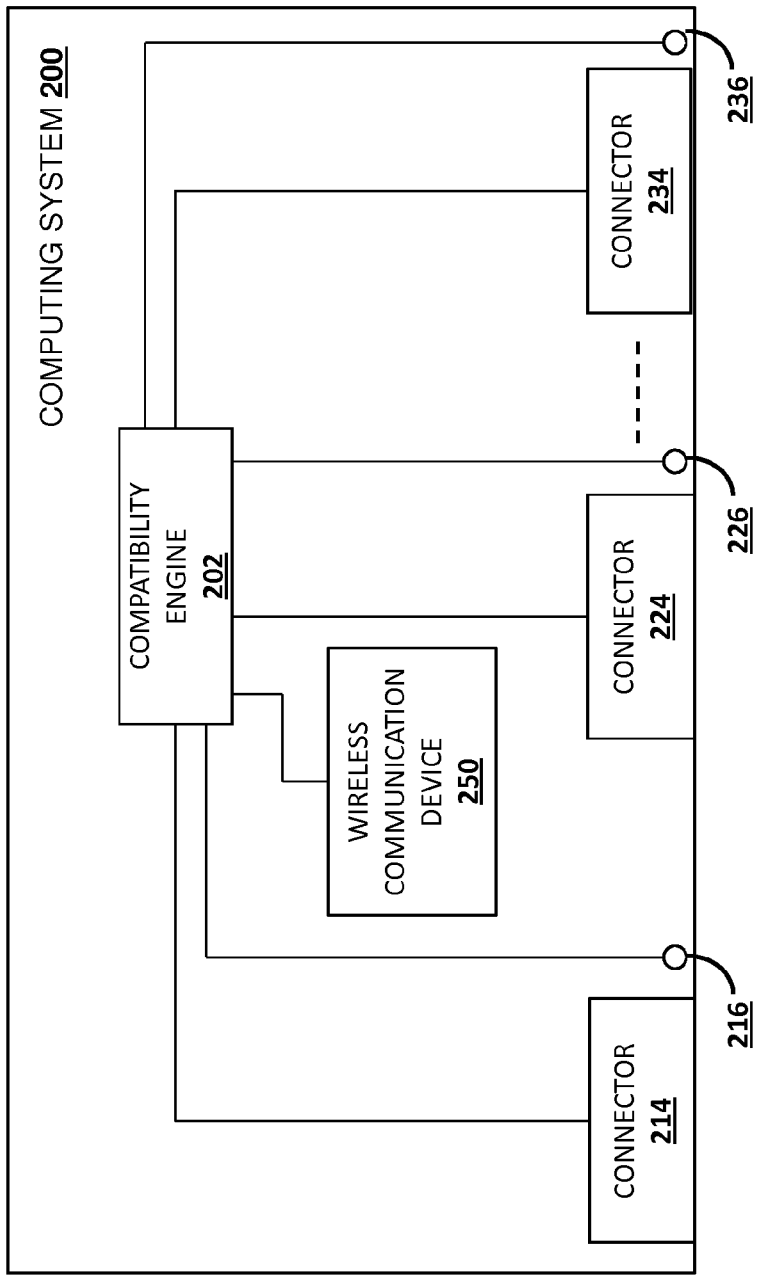
FIG. 2b is a schematic view illustrating another embodiment of a computing system.

Referring now to FIG. 2b, an alternative embodiment of a computing system 200 is illustrated. The embodiment of the computing system 200 in FIG. 2b is similar to that in FIG. 2a in many regards, and thus similar element numbers are used for similar components. However, the computing system 200 includes a wireless communication device 250 that is configured to communicate with modules that are located adjacent more than one of the connectors 214, 224, and up to 234 on the computing system 200. As such, the wireless communication device 250 may not be associated with a single connector on the computing system 200 and thus may be able to serve as a global wireless communication device for all the connectors on the computing system 200, or a wireless communication device for a plurality of connectors (while also allowing some connectors to be associated with a single wireless communication device in some embodiments). As such, computing devices operating according to the teachings of the present disclosure may include one or more wireless communication devices dedicated to a respective single connector, wireless communication devices shared by multiple connectors, and/or other configurations that may be based on physical requirements of the computing system, cost considerations, and/or a variety of other computing system details known in the art.

In an embodiment, the wireless communication devices 212, 222, 232, and 250 in FIGS. 2a and 2b include one or more wireless readers that are configured to communicate with wireless tags. More specifically, the wireless readers may be configured to receive and/or retrieve data from wireless tags in modules (discussed in further detail below). However, in some embodiments, the wireless communication device may be a transmitter/receiver system such as, for example, a Near Field Communication (NFC) system, a Bluetooth communication system, an Radio Frequency Identification (RFID) communication system, and/or a variety of other wireless communication systems known in the art.

Figure 3:
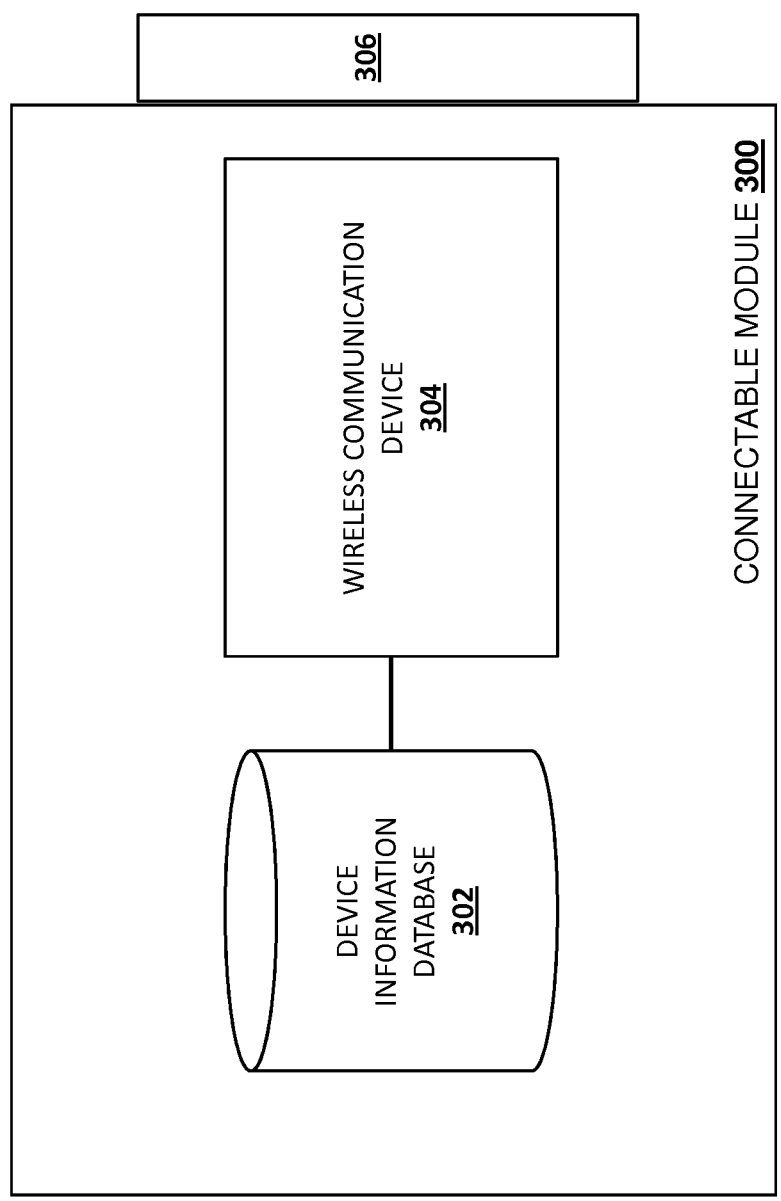
FIG. 3 is a schematic view illustrating an embodiment of a connectable module.

Referring now to FIG. 3, an embodiment of a module 300 is illustrated. The module 300 includes a wireless communication device 304 that is coupled to a device information database 302 and a module connector 306. In the embodiments illustrated and discussed below, the module connector 306 is a Field Replaceable Unit (FRU) connector that may be provided on a power supply unit or fan system and that is configured to be connected to the FRU connector(s) on the computing system 200 mentioned above. However, the connector 306 may be any modular connector known in the art, as well as other types of connectors that may include PCI connectors, Universal Serial Bus (USB) connectors, High Definition Multimedia Interface (HDMI) connectors, DisplayPort connectors, Video Graphics Array (VGA) connectors, audio connectors, digital optic connectors, Digital Visual Interface (DVI) connectors, RCA connectors, Firewire connectors, eSATA connectors, phone connectors (e.g., RJ11), and/or a variety of other connectors known in the art.

In an illustrative embodiment discussed below, the wireless communication device 304 may include one or more wireless tags that are configured to transmit module information that is associated with the module 300. However, in some embodiments, the wireless communication device 304 may be a transmitter/receiver system such as, for example, a Near Field Communication (NFC) system, a Bluetooth communication system, an Radio Frequency Identification (RFID) communication system, and/or a variety of other wireless communication systems known in the art.

The module information may be stored in the device information database 302, retrieved as discussed below by the wireless communication device 304, and used as discussed below by the compatibility engine 202. In accordance with various embodiments, the module information may include a type of the module connector 306, a hardware configuration of the module 300, a software configuration of the module 300, authentication information for the module 300, and/or a variety of other module information known in the art. In some non-limiting examples, the hardware configuration of the module 300 may include a hardware specification for the module 300 such as a maximum voltage level of a power supply module, fan operation details of a fan system module (e.g., a fan speed, a direction of airflow, a number of fans, etc.), a size and/or type of a memory device in a memory module, and a variety of other hardware specification known in the art. Further, authentication information may include a password, a user ID, a MAC address, a version of software of a storage device (not shown) of the module, encrypted/decrypted data, cryptographic keys, and/or a variety of other authentication information known in the art.

Figure 4:
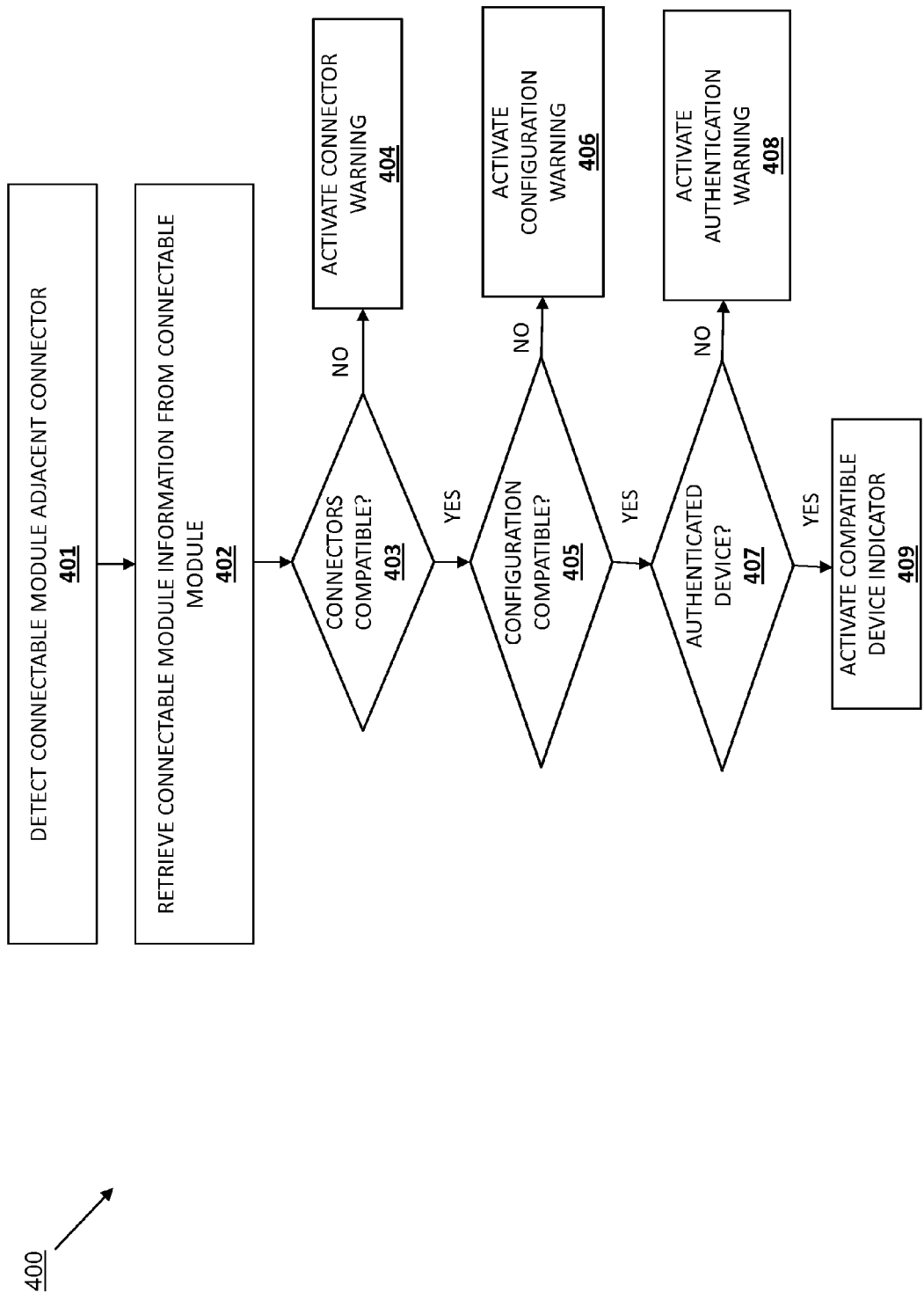
FIG. 4 is a flow chart illustrating an embodiment of a method for indicating the compatibility of a connectable module.

FIG. 4 shows a flow chart of a method 400 indicating the compatibility of a connectable module with an information handling system in accordance with various embodiments. The embodiment of the method 400 discussed below is provided merely an example, and is not intended to limit the present disclosure. Additional operations may be provided before, during, and after the method 400, and some operations described can be replaced, eliminated, or moved around for additional embodiments of the method. The method 400 is described below in conjunction with FIGS. 5a-e illustrating various embodiments that detail how, prior to the module 300 being connected to the computing system 200, the computing system 200 is configured to determine whether the module 300 is compatible via a wireless communication, and further activate a warning if the module 300 is incompatible with the computing system 200 or a connector on the computing system 200 that the module 300 is adjacent. More specifically, in one embodiment, via such wireless communication, the method 400 utilizes the module information that describes the module 300 to enable the computing system to determine the compatibility of the module 300 with the computing system 200 and/or the compatibility of the module connector 306 with the connector on the computing system 200 that the module 300 is adjacent before the module 300 is actually connected to the computing system 200.

The method 400 begins at block 401 where a presence of a connectable module is detected. In an embodiment, the wireless communication device 304 in the module 300 is configured to transmit the module information that is stored in the device information database 302. For example, the wireless communication device 304 may be an NFC tag that operates in the 13.65 MHz frequency range over a typically short distance (e.g., a few centimeters to a few inches). That is, the wireless communication device 304 may be configured to communicate over a short distance (e.g., a few centimeters to a few inches). The wireless communication devices (212, 222, 232, and 250) of the computing system 200 are configured detect the presence of the module 300 while the module 300 is located adjacent the computing system 200 using wireless communication techniques known in the art (e.g., the wireless communication device 304 broadcasting an identifier that is received by one or more of the wireless communication devices 212, 222, 232, and/or 250). As such, the term "adjacent" may refer to the module 300 being located within a variety of short range wireless communication distances know in the art relative to the wireless communication devices, and does not necessarily refer to the module being immediately next to, adjoining, or in contact with the wireless communication devices (although such uses of adjacent are not outside the scope of the present disclosure.)

In a specific example, when the connectable module 300 is located adjacent the connector 214, only the wireless communication device 212, rather than the wireless communication devices 222 or 232, detects the presence of the module 300. While the wireless communication device (212, 222, 232, and 250) of the computing system 200 and the wireless communication device 304 are discussed as being implemented as an NFC reader and an NFC tag, respectively, any types of wireless communication devices (e.g., Bluetooth) that are capable of transmitting/receiving data over a short distance are envisioned as falling within the scope of the present disclosure. Alternatively or additionally, the wireless communication device of the computing system 200 may further acknowledge the presence of the module 300 upon detection (e.g., by blinking an indicator on the wireless communication device to indicate the communication between the wireless communication device and the module 300).

Upon detecting the presence of the module 300, the method 400 proceeds to block 402 where the wireless communication device (212, 222, 232, and 250) of the computing system 200 retrieves/receives the module information stored in the device information database 302 through communication with the wireless communication device 304 in the module 300. Using the embodiment including the wireless communication devices 212, 222, and 232 illustrated in FIG. 2a, the wireless communication device in the computing system 200 may retrieve the module information from the module 300 when the module 300 is located adjacent the connector associated with that wireless communication device. For example, when the connectable module 300 is located close enough (e.g., a few centimeters to a few inches) to the connector 214, only the wireless communication device 212 may be configured to retrieve the connectable module information from the connectable module 300 (i.e., each of the wireless communication devices 214, 224, and 234 may be configured to communication only with devices within a few centimeters to a few inches). In another example, using the embodiment including the wireless communication device 250 as shown in FIG. 2b, the wireless communication device 250 may retrieve the module information whenever there is a module 300 located adjacent any of the connectors (e.g., 214, 224, and 234) on the computing system 200 (i.e., the wireless communication device 250 may be configured to communication with any module 300 located adjacent the computing system 200. Continuing with the same example provided above, when the connectable module 300 is located in proximity to any of the connectors 214, 224, and 234, the wireless communication device 250 is configured to retrieve the connectable module information stored in the device information database 302 through communication with the wireless communication device 304 in the nearby module 300. As such, the wireless communication device 250 may be capable of communicating with a module over a longer distance (e.g., inches to feet). The following discussion is limited to the embodiment that includes the wireless communication devices 212, 222, and 232 illustrated in FIG. 2a. However, one of skill in the art in possession of the present disclosure will recognize that the system illustrated in FIG. 2b may operate in substantially the same manner as discussed below while remaining within the scope of the present disclosure.

The method 400 then proceeds to decision block 403 where it is determined whether the connectable module 300 includes a connector that is compatible with the computing system. In an embodiment, after the wireless communication device of the computing system 200 retrieves the module information from the module 300, the compatibility engine 202 may receive the module information from the wireless communication device(s). As described above, the module information may include a type of the module connector 306 on the module 300. The compatibility engine 202 uses the type of the module connector 306 on the module 300 to determine whether the module connector 306 on the connectable module 300 is compatible with the connector (214, 224, or 234) to which the module 300 is adjacent (e.g., if they are the same types of connector). If the compatibility engine 202 determines that the type of the module connector 306 is not compatible with the type of the connector (214, 224, or 234) to which the module 300 is adjacent, the method 400 proceeds to block 404 where a connector compatibility warning is activated. In an embodiment, the activation of the warning at block 404 may include activating a light emitting diode (LED), activating a display to display a compatibility message, activating a movable/vibratable device, activating a sound device, and/or providing a variety of other warnings known in the art.

Figure 5A:
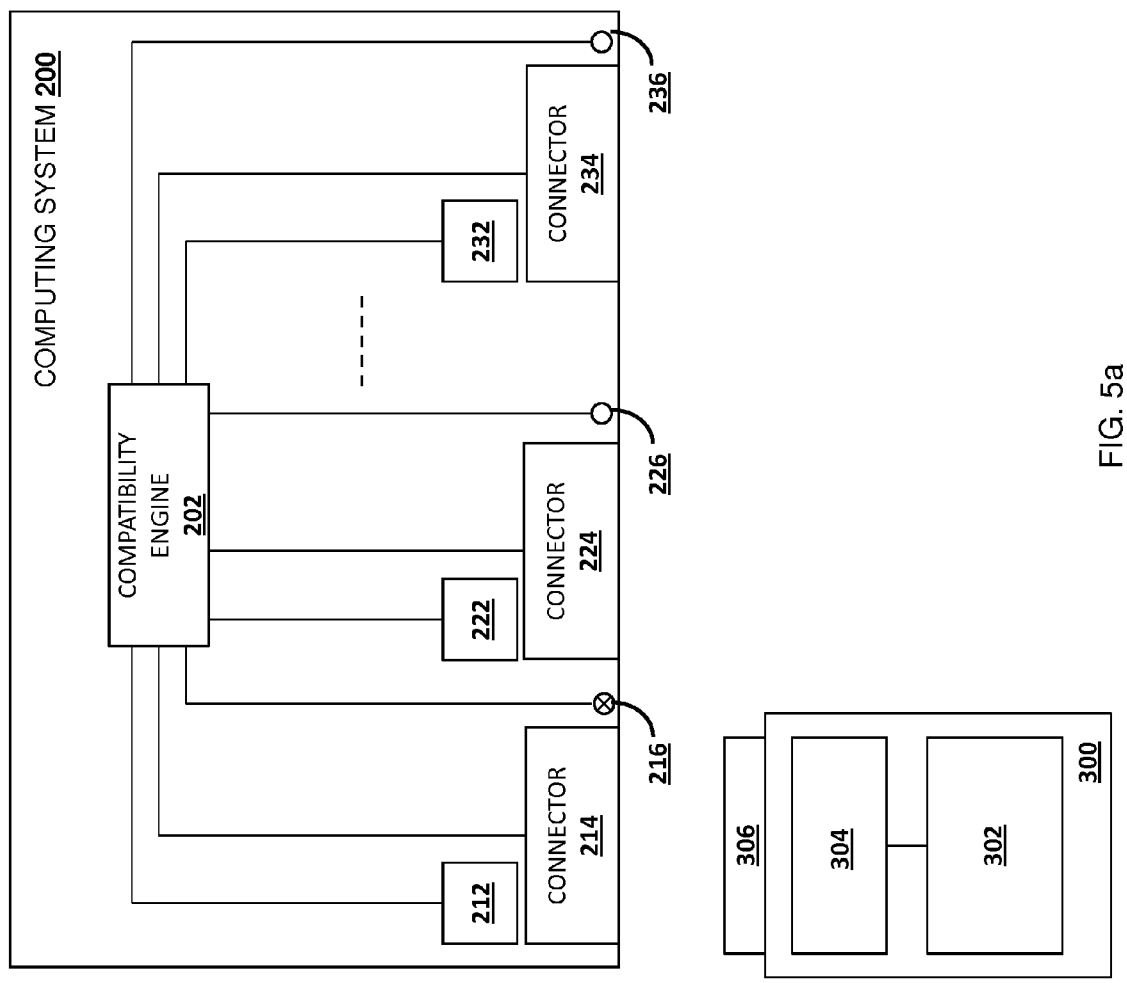
FIG. 5a is a schematic view illustrating an embodiment of the computing system of FIG. 2a indicating a compatibility issue with to the connectable module of FIG. 3 prior to the connectable module being connected to the computing system.

Referring now to FIG. 5a, an embodiment of the activation of a connector compatibility warning is illustrated. FIG. 5a illustrates the connectable module 300 located adjacent the connector 214, with the wireless communication device 212 in the communication system having retrieved the module information stored in the device information database 302 through communication with the wireless communication device 304 (i.e., as discussed above with reference to block 402) upon detecting the presence of the module 300 (i.e., as discussed above with reference to block 401). As discussed above, in response to the compatibility engine 202 determining that the type of the module connector 306 on the module 300 was not compatible with the type of the connector 214 on the computing system 200 (i.e., as discussed above with reference to block 403), a connector compatibility warning is activated (i.e., as discussed above with reference to block 404). FIG. 5a illustrates an embodiment of the indicators 216, 226, and 236 as LEDs, and the activation of the connector compatibility warning is illustrated as implemented by lighting the indicator (LED) 216 that is associated with the connector 214 and the wireless communication device 212. As discussed above, in other embodiments, the activation of the connector compatibility warning may be implemented by activating a sound device, activating a movable/vibratable device, activating a display to display a compatibility message, combination thereof, and/or providing a variety of other warnings known in the art. Alternatively or additionally, in response to the compatibility engine 202 determining that the type of the module connector 306 on the module 300 was not compatible with the type of the connector 214 on the computing system 200, a mechanical and/or electrical device, coupled to the computing system 200, may be implemented to prevent the module connector 306 being wrongly or inadvertently connected to the connector 214 on the computing system 200. For example, a relay device is coupled to the connector 214. Such relay device 214 may activate a metal barrier that isolates the connector 214 so that any wrong or inadvertent connection to the connector 214 may be prevented.

In another embodiment, using the computing system 200 illustrated in FIG. 2b, the compatibility engine 202 may indicate the compatibility issue in a manner that is different than described above. In one example, the compatibility engine 202 may not be able to determine which of the connectors a detected module is adjacent due to the wireless communication device 250 detecting modules adjacent the computing system 200 and possible any of a plurality of connectors on the computing system. As such, instead of activating an indicator adjacent a particular connector, the compatibility engine 202 may determine any number of connectors on the computing system 200 that are not compatible with the module connector 306 on the module 300, and activate the indicator associate with each of those connectors. Similarly, the compatibility engine 202 may operate to indicate compatible connectors (e.g., via a green LED) and incompatible connectors (e.g., via a red LED) in the same manner. Similarly functionality may be provided to indicate configuration compatibility, discussed in further detail below.

Figure 5B:
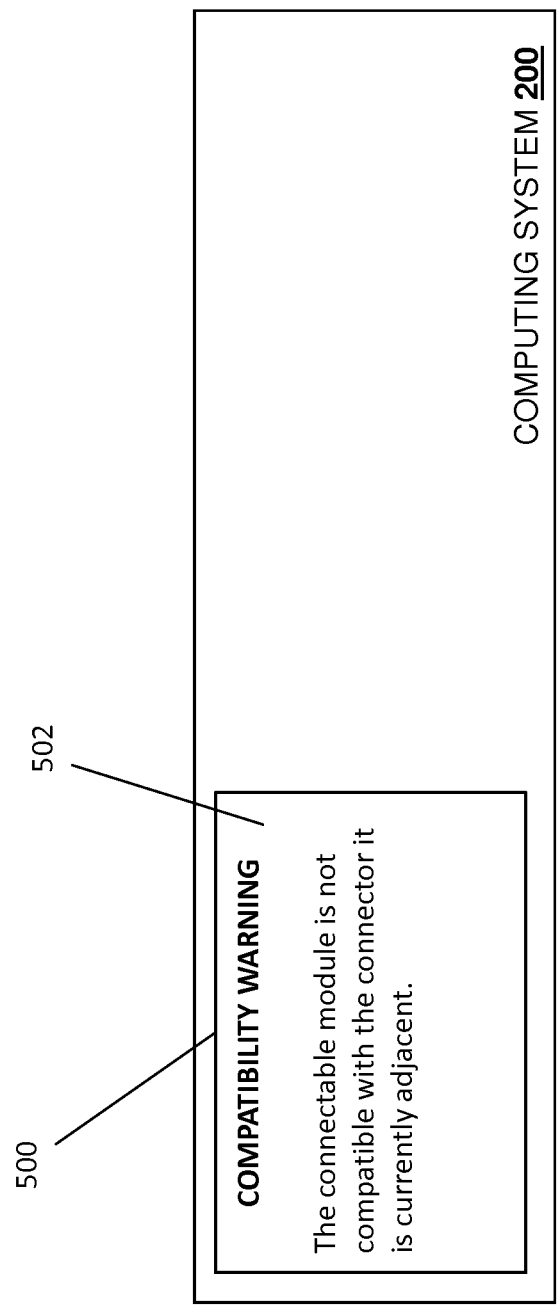
FIG. 5b is a schematic view illustrating an embodiment of a compatibility message that indicates a compatibility issue with the connectable module of FIG. 3 prior to the connectable module being connected to the computing system.

Referring now to FIG. 5b, an embodiment of a compatibility message is illustrated which may be displayed on a display device (e.g., the display device 110 discussed above with reference to FIG. 1) coupled to or embedded in the computing system 200. In this non-limiting example, a display device 500 is provided on a front surface of the computing system 200, and is illustrated displaying a compatibility message 502 that includes the text as shown, "The connectable module is not compatible with the connector it is currently adjacent." Such compatibility message is intended to signify a user the compatibility issue and may further let the user know a cause to the issue before the user connects the connectable module 300 to an incompatible/wrong connector on the computing system 200. While a specific compatibility message displayed on a display device that is embedded in the computing system 200 is illustrated, one of skill in the art in possession of the present disclosure will recognize that a variety of different messages may be displayed to provide the user with any of a variety of details about the compatibility issue between the module 300 and the computing system 200, and the display need not be integrated into the computing system 200. For example, a display device may be coupled to the computing system via a management system, and my display the compatibility message 502 via a variety of management interfaces (e.g., a Command Line Interface (CLI) or other management interface known in the art).

If, at block 403, if the compatibility engine 202 determines that the type of the module connector 306 on the module 300 is compatible with the type of the connector (214, 224, or 234) on the computing system 200 to which the connectable module 300 is adjacent, the method 400 proceeds to decision block 405 where it is determined whether the configuration of the connectable module 300 is compatible with the computing system 200. In an embodiment, the configuration compatibility determined at decision block 405 may be a hardware configuration compatibility. At decision block 405, the compatibility engine 202 may determine whether a maximum voltage level of a power supply module is compatible with the computing system 200, whether a fan system configuration of a fan system module (e.g., a fan speed, a direction of airflow, a number of fans, etc.) is compatible with the computing system 200, whether a size and/or type of a memory device of in a memory module is compatible with the computing system 200, and a variety of other hardware configuration compatibilities known in the art. While the configuration compatibilities provided and discussed below are hardware configuration compatibilities, one of skill in the art in possession of the present disclosure will recognize that software configuration compatibilities may be determined at decision block 405 while remaining within the scope of the present disclosure.

If at decision block 405 the compatibility engine 202 determines that the module 300's configuration is not compatible with the computing system 200, the method 400 proceeds to block 406 to activate a configuration compatibility warning. For example, at decision block 405, the compatibility engine 202 may determine that a maximum voltage level provided by a power supply module exceeds a maximum voltage level that is safe for the computing system. In another example, at decision block 405, the compatibility engine 202 may determine that an airflow direction of a fan system module is opposite an airflow direction of one or more other fan systems already installed in the computing system. Details of the configuration compatibility warning provided at block 406 will be provided below in conjunction with the illustrative embodiment of FIG. 5c. If, at decision block 405, the compatibility engine 202 determines that the configuration of the module 300 is compatible with the computing system 200, the method 400 continues to decision block 407, discussed in further detail below.

Referring still to FIG. 4, in an alternative embodiment, after the compatibility engine 202 determines that the type of the connector 306 on the connectable module 300 is compatible with the type of the connector 234 on the computing system 200 but the configuration of the module 300 is not compatible with the computing system 200, the module 300 may not function properly. More specifically, even though the module 300 is connected to the connector 234 on the computing system 200, the module 300 may not be provided with any power from the computing system 200 (i.e., a completely inoperable module), and/or if power is provided, the compatibility engine 202 of the computing system 200 may cause the module 300 to perform a portion of the module 300's full functionality (i.e., a partially operable module). As such, if a module with a compatible connector but with an incompatible configuration is inadvertently being connected to the computing system 200, an additional warning (i.e., a completely inoperable and/or a partially operable module) may be provided by the computing system 200.

Figure 5C:
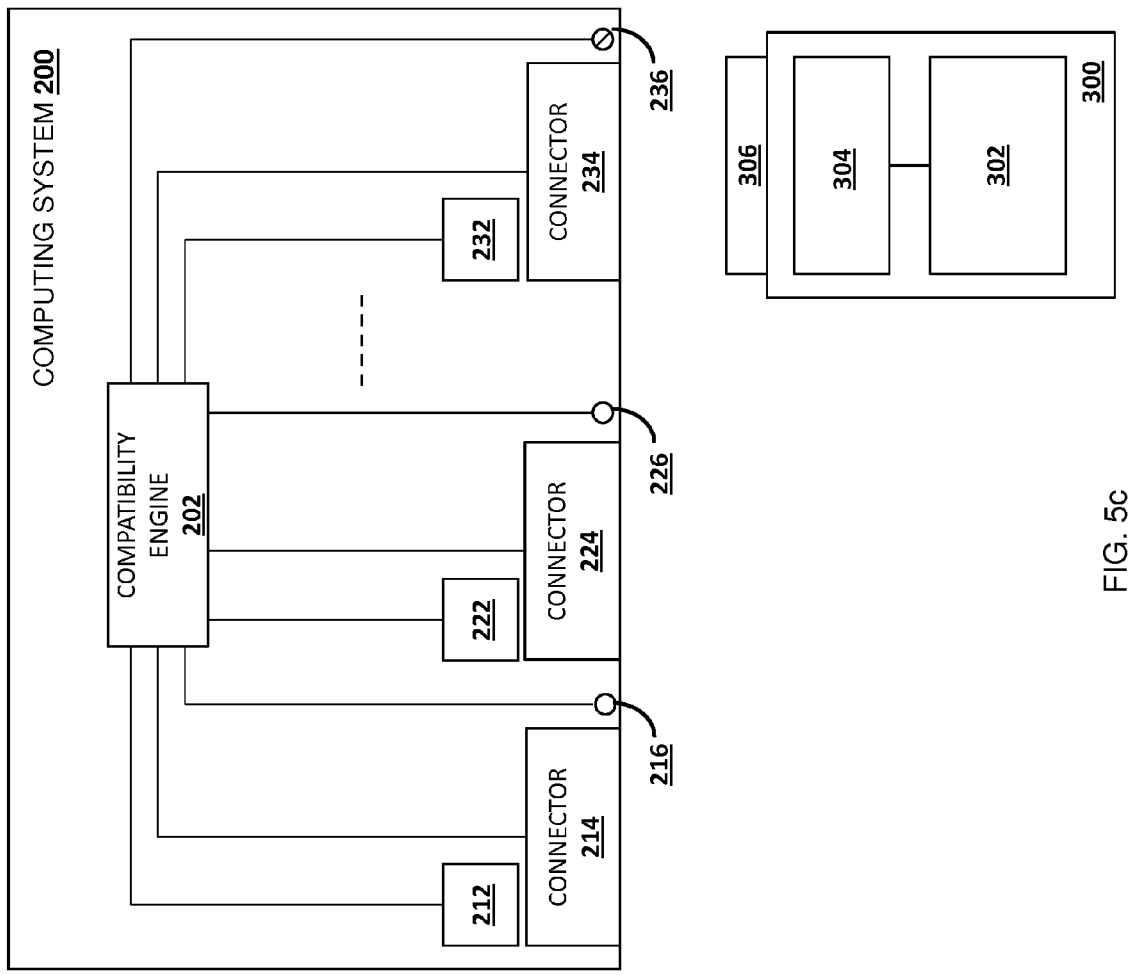
FIG. 5c is a schematic view illustrating an embodiment of the computing system of FIG. 2a indicating a compatibility issue with the connectable module of FIG. 3 prior to the connectable module being connected to the computing system.

Referring now to FIG. 5c, an embodiment of a configuration compatibility warning is illustrated. FIG. 5c illustrates the connectable module 300 located adjacent the connector 234, and the compatibility engine 202 has determined that the type of the connector 306 on the connectable module 300 is compatible with the type of the connector 234 on the computing system (i.e., as discussed above with reference to decision block 403). However, after determining that the configuration of the module 300 is not compatible with the computing system 200 (i.e., as discussed above with reference to decision block 405), the compatibility engine 202 activates a configuration compatibility warning at block 406. As illustrated in FIG. 5c, the indicator 236 associated with the connector 234 is activated to warn the user of the existence of an incompatible configuration of the module 300 with the computing system 200. As mentioned in the embodiments with respect to FIG. 5a, while the activated warning is illustrated and discussed as lighting the indicator 236 (an LED), any suitable types of warnings, such as activating a display to display a compatibility message, activating a sound device, combinations thereof, and/or other warnings known in the art will fall within the scope of the present disclosure. Regardless of which type of warning is implemented, the activation of the configuration compatibility warning differs from the activation of the connector compatibility warning so as to enable a user to distinguish and pinpoint a cause of the corresponding incompatibility issue. For example, in the example of implementing the indicators 216 and 236 as LEDs, the indication of the connector compatibility warning may include lighting the indicator 216 (LED) in red color; while the indication of the configuration compatibility warning may include lighting the indicator 236 (LED) in yellow color.

Referring back to FIG. 4, the method 400 then proceeds to block 407 where it is determined whether the module is an authenticated device. In an embodiment, the compatibility engine 202 uses authentication information included in the module information retrieved at block 402 to determine whether the connectable module 300 is an authenticated device. For example, the compatibility engine 202 may operate at block 407 to determine whether a code, cryptographic key, or other authentication information from the module 300 matches authentication information in the computing system 200 (e.g., in a database of authentic devices that may be connected to the computing system 200). If, at decision block 407, the compatibility engine 202 determines that the module 300 is not an authenticated device, the method 400 proceeds to block 408 where an authentication compatibility warning is activated. In an embodiment, the activation of the authentication compatibility warning may include activating an indicator associated with the connector to which the connectable module 300 is adjacent, such as lighting the associated LED (i.e., the indicator) in orange color. As described above, regardless of which type of warning is implemented, the activation of the authentication compatibility warning is distinguishable to the user from other activations of warnings (e.g., connector compatibility warning and configuration compatibility warning).

Referring still to decision block 407, if the compatibility engine 202 determines that the module 300 is an authenticated device, the method 400 continues in block 409 where an indicator is activated to indicate that the connectable module 300 is a compatible device with the computing system 200. In the example of implementing the indicator as an LED, the activation of the indicator may include lighting the indicator in green color, which is different from the above mentioned activation of indicators to indicate a compatibility issue such as, for example, the connector compatibility warning (red color), the configuration compatibility warning (yellow color), and the authentication compatibility warning (orange color).

Figure 5D:
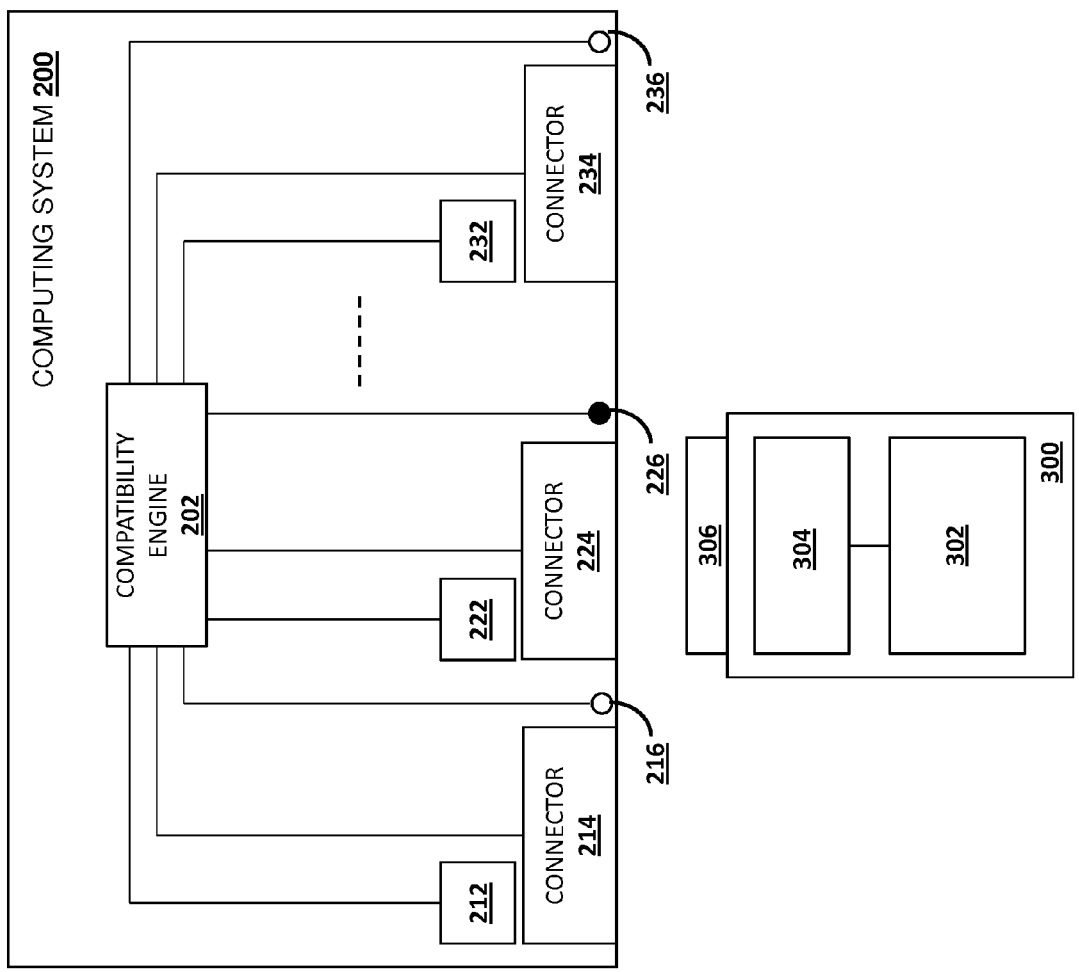
FIG. 5d is a schematic view illustrating an embodiment of the computing system of FIG. 2a indicating that the connectable module of FIG. 3 is compatible with the computing system prior to the connectable module being connected to the computing system.
Figure 5E:
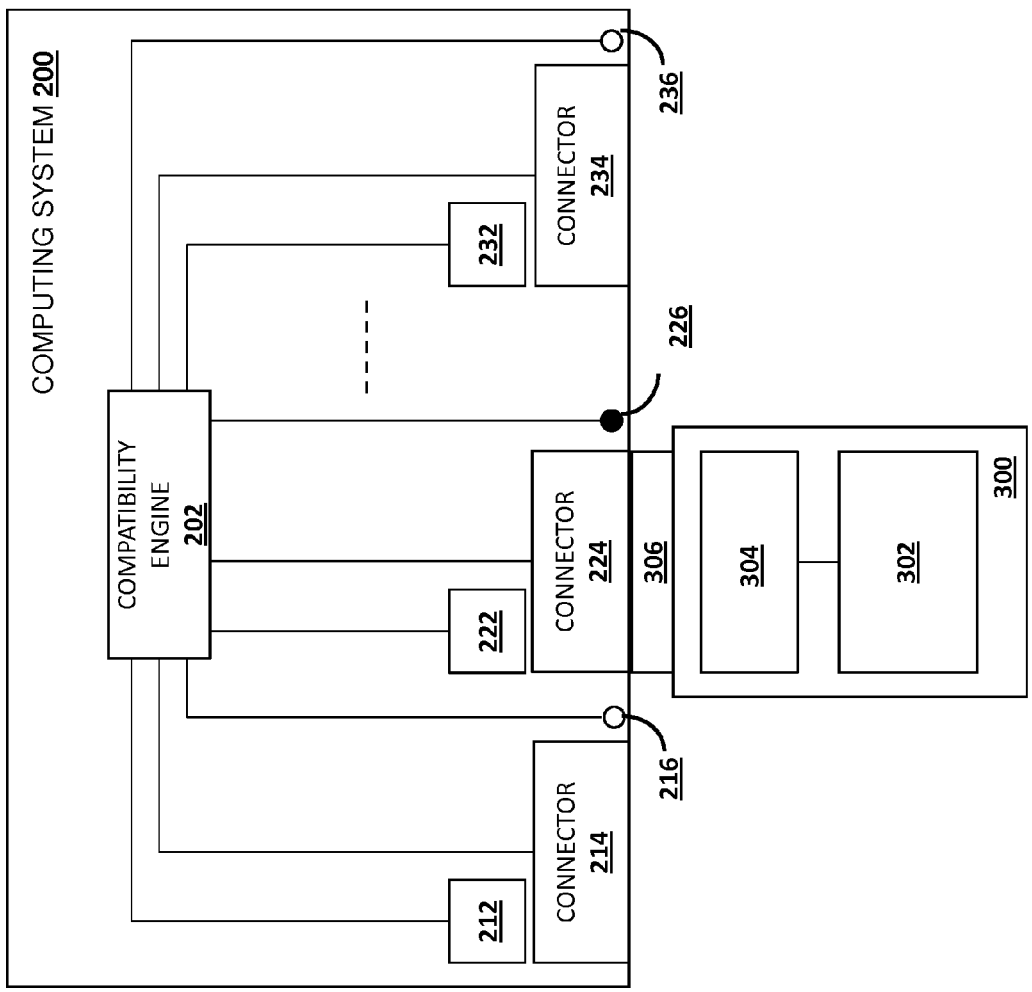

FIG. 5d illustrates an embodiment of activating an indicator to indicate that the module 300 is a compatible device with the computing system 200. In FIG. 5d, the module 300 is illustrated as being located adjacent the connector 224, and the compatibility engine 202 has determined that the type of the module connector 306 on the module 300 is compatible with the type of the connector 234 (i.e., as discussed above with reference to decision block 403), that the configuration of the module 300 is compatible with the computing system 200 (i.e., as discussed above with reference to decision block 405), and that the connectable module 300 is an authenticated device (i.e., as discussed above with reference to decision block 407). As shown in FIG. 5d, the indicator 226 is activated to indicate to the user that the module 300 is a compatible/authenticated device with the computing system 200. As mentioned above, the activation of the indicator 226 may be implemented as lighting the indicator 226 in green color or any color that is distinguishable from other activations of the compatibility warnings to the user. FIG. 5e illustrates the module connector 306 on the module 300 connected to the connector 224 on the computing system 200 after the compatibility engine 202 has determined that the module 300 is a compatible/authenticated device with the computing system 200, and indicated that compatibility to the user such that the user can be confident in connecting the module 300 to the connector 224 on the computing system 200, as illustrated in FIG. 5e.

Thus, systems and methods have been described that provide for indications of the compatibility of a module with a computing system prior to that module being connected to a connector on the computing system. The computing system communicates wirelessly with the module when the module is positioned adjacent a connector on the computing system, and may retrieve a variety of information about the module. That information may be used to determine whether the module is compatible with the connector to which it is adjacent, whether the module is configured correctly for the computing system, whether the module is an authentic device authorized for use with the computing system, and/or a variety of other compatibility details known in the art. The computing system may then activate indicator(s) on the computing system to indicate to the user any compatibility issues between the module and the computing system, or whether the module is compatible with the computing system. As such, the user knows the compatibility of the module and the computing system prior to connecting the module to the computing system, which can prevent the damaging of connectors, the malfunctioning of the computing system due to the use of a incorrectly configured module, the use of an unauthentic device with a computing system, and/or a variety of other benefits that will be apparent to one of the skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A compatibility indication system, comprising:
   a first connectable module that includes a first connector and a first wireless communication device that is configured to transmit first connectable module information; and
   a computing system, comprising:
   a second connector that is compatible with the first connector on the first connectable module such that the first connector on the first connectable module may be connected to the second connector;
   a second wireless communication device that is configured to receive the first connectable module information when the first connectable module is located adjacent the second connector; and
   a compatibility engine that is coupled to the second wireless communication device, wherein the compatibility engine is configured to:
   receive the first connectable module information;
   determine, using the first connectable module information, a first connectable module configuration of the first connectable module;

determine that the first connectable module configuration is incompatible with the computing system; and activate, before the first connector on the first connectable module is connected to the second connector on the computing system, an incompatible connectable module warning that is based on the incompatibility of the first connectable module configuration with the computing system.

2. The system of claim 1, wherein the first wireless communication device includes a near field communication (NFC) tag, and the second wireless communication device includes an NFC reader.

3. The system of claim 1, wherein the first connectable module information includes at least one of: a type of the first connector on the first connectable module and authentication information.

4. The system of claim 1, wherein the activation of the incompatible connectable module warning includes at least one of activating a light emitting diode (LED), activating a display to display a compatibility message, and activating a sound device.

5. The system of claim 1, further comprising:
a second connectable module that includes a third connector and a first wireless communication device that is configured to transmit second connectable module information, wherein the compatibility engine is configured to:
receive the second connectable module information;
determine, using the second connectable module information, a connector configuration of the third connector on the second connectable module;
determine that the connector configuration is incompatible with the second connector; and
activate, before the third connector on the second connectable module is connected to the second connector on the computing system, an incompatible connector warning that is based on the incompatibility of the connector configuration and the second connector.

6. The system of claim 1, wherein the compatibility engine is configured to:
determine the first connectable module configuration based on a hardware configurations of the first connectable module that includes at least one of a maximum voltage level of a power supply module in the first connectable module, a fan system configuration in the first connectable module, a size of a memory device in the first connectable module, and a type of a memory device in the first connectable module.

7. The system of claim 1, wherein the compatibility engine is configured to:
determine, using the first connectable module information, a first connectable module authentication level of the first connectable module;
determine that the first connectable module authentication level is incompatible with the computing system; and
activate, before the first connector on the first connectable module is connected to the second connector on the computing system, a first connectable module authentication warning that is based on the incompatibility of the first connectable module authentication level with the computing system.

8. An information handling system (IHS), comprising:
a system connector;
a wireless communication device;
a processing system that is coupled to the system connector and wireless communication device; and
a memory system that is coupled to the processing system and that includes instructions that, when executed by the processing system, cause the processing system to provide a compatibility engine that is configured to:
receive, using the wireless communication device from a first connectable module that includes a first connector that is compatible with the system connector such that the first connector on the first connectable module may be connected to the system connector, first connectable module information from the first connectable module when the first connectable module is located adjacent the system connector;
determine, using the first connectable module information, a first connectable module configuration of the first connectable module;
determine that the first connectable module configuration is an incompatible connectable module configuration; and
activate, before the first connector on the first connectable module is connected to the system connector, an incompatible connectable module warning that is based on the first connectable module configuration being an incompatible connectable module configuration.

9. The IHS of claim 8, wherein the wireless communication device includes a near field communication (NFC) reader that is configured to receive the first connectable module information from an NFC tag in the first connectable module.

10. The IHS of claim 8, wherein the connectable module information includes at least one of: a type of the first connector on the first connectable module, and authentication information.

11. The IHS of claim 8, wherein the activation of the incompatible connectable module warning includes at least one of activating a light emitting diode (LED), activating a display to display a compatibility message, and activating a sound device.

12. The IHS of claim 8, wherein the compatibility engine is configured to:
receive, using the wireless communication device from a second connectable module that includes a second connector, second connectable module information from the second connectable module when the second connectable module is located adjacent the system connector;
determine, using the second connectable module information, a connector configuration of the second connector on the second connectable module;
determine that the connector configuration is incompatible with the system connector; and
activate, before the second connector on the second connectable module is connected to the system connector, an incompatible connector warning that is based on the incompatibility of the connector configuration and the system connector.

13. The IHS of claim 8, wherein the compatibility engine is configured to:
determine the first connectable module configuration based on a hardware configuration of the first connectable module that includes at least one of a maximum voltage level of a power supply module in the first connectable module, a fan system configuration in the first connectable module, a size of a memory device in the first connectable module, and a type of a memory device in the first connectable module.

14. The IHS of claim 8, wherein the compatibility engine is configured to:
    determine, using the first connectable module information, a first connectable module authentication level of the first connectable module;
    determine that the first connectable module authentication level is an incompatible authentication level; and
    activate, before the first connector on the first connectable module is connected to the system connector, a first connectable module authentication warning that is based on the first connectable module authentication level being an incompatible authentication level.

15. A method for determining the compatibility of a connectable module, comprising:
    receiving, by a computing system via wireless communications from a first connectable module that includes a first connector that is compatible with a second connector on the computing system such that the first connector on the first connectable module may be connected to the second connector on the computing system, first connectable module information from the first connectable module when the first connectable module is located adjacent the computing system;
    determining, by the computing system using the first connectable module information, a first connectable module configuration of the first connectable module;
    determining, by the computing system, that the first connectable module configuration is incompatible with the computing system; and
    activating, by the computing system before first connector on the first connectable module is connected to the second connector on the computing system, an incompatible connectable module warning that is based on the incompatibility of the first connectable module configuration with the computing system.

16. The method of claim 15, wherein the first connectable module information includes at least one of: a type of the first connector on the first connectable module and authentication information.

17. The method of claim 15, wherein the activation of the incompatible connectable module warning includes at least one of activating a light emitting diode (LED), activating a display to display a compatibility message, and activating a sound device.

18. The method of claim 15, further comprising:
    receiving, by the computing system via wireless communications from a second connectable module that includes a third connector that is compatible with the second connector on the computing system such that the third connector on the second connectable module may be connected to the second connector on the computing system, second connectable module information from the second connectable module when the second connectable module is located adjacent the computing system;
    determining, by the computing system using the second connectable module information, a connector configuration of the third connector on the second connectable module;
    determining, by the computing system, that the connector configuration is incompatible with the second connector on the computing system; and
    activating, by the computing system before third connector on the second connectable module is connected to the second connector on the computing system, an incompatible connectable module warning that is based on the incompatibility of the connector configuration and the second connector on the computing system.

19. The method of claim 15, wherein the first connectable module configuration is based on a hardware configuration of the first connectable module that includes at least one of a maximum voltage level of a power supply module in the first connectable module, a fan system configuration in the first connectable module, a size of a memory device in the first connectable module, and a type of a memory device in the first connectable module.

20. The method of claim 15, further comprising:
    determining, by the computing system using the first connectable module information, a first connectable module authentication level of the first connectable module;
    determining, by the computing system, that the first connectable module authentication level is an incompatible authentication level; and
    activating, by the computing system before the first connector on the first connectable module is connected to the second connector on the computing system, a first connectable module authentication warning that is based on the incompatibility of the first connectable module authentication level with the computing system.

* * * * *